Jan. 6, 1959  T. EARLE  2,867,256
METHOD OF STRIPPING EPIDERMAL MATERIAL FROM GRAINS
Filed Aug. 8, 1955

INVENTOR.
Theodore Earle
BY
ATTORNEY

2,867,256
METHOD OF STRIPPING EPIDERMAL MATERIAL FROM GRAINS

Theodore Earle, Santa Monica, Calif.

Application August 8, 1955, Serial No. 526,854

3 Claims. (Cl. 146—221.9)

This invention relates to the treatment of seeds and cereal grains for the removal therefrom of integumental material, and more particularly to the treatment of wheat, rye, brown rice, and some types of oats, for the detachment and separation therefrom of bran coat material commonly investing the berries, and has as an object to provide a novel and improved method applicable with facility and economy to strip the epidermal material from the individual berries of such grains.

A further object of the invention is to provide a novel and improved method for the stripping of bran coat material from seeds and cereal grains as a consequence of pressures and frictions developed on and between the grain berries during agitation and migration thereof.

A further object of the invention is to provide a novel and improved method for the stripping of bran coat material from seeds and cereal grains that is characterized by controlled tempering of the material preliminary to migratory agitation thereof.

A further object of the invention is to provide a novel and improved method for the stripping of bran coat material from seeds and cereal grains that is characterized by moisture-conditioning and time-tempering of the material for subsequent epidermal reaction to the pressures and frictions of grain migration.

A further object of the invention is to provide a novel and improved, multi-stage method applicable to the stripping of outer bran coat material from wheat with enhanced facility and practical advantage.

A further object of the invention is to provide a novel and improved, multi-stage method applicable to the removal of all bran coat material from brown rice with enhanced facility and practical advantage.

A further object of the invention is to provide a novel and improved method for the stripping of integumental material from seeds and cereal grains that is adaptable to practice through known and available instrumentalities, that is susceptible of expedient adaptation for the effective treatment of specific materials, that is characterized by simple positive controls susceptible of ready determination with respect to given grain materials, that is operable with efficiency and economy, that is productive of an end product conditioned for further conventional processing, and that is positive in attainment of the ends for which it is devised.

With the foregoing and other objects in view, my invention consists in the nature and sequential relation of steps constituting a method as hereinafter set forth, pointed out in my claims, and typified by the accompanying drawing in which—

Figures 1, 2, 3:
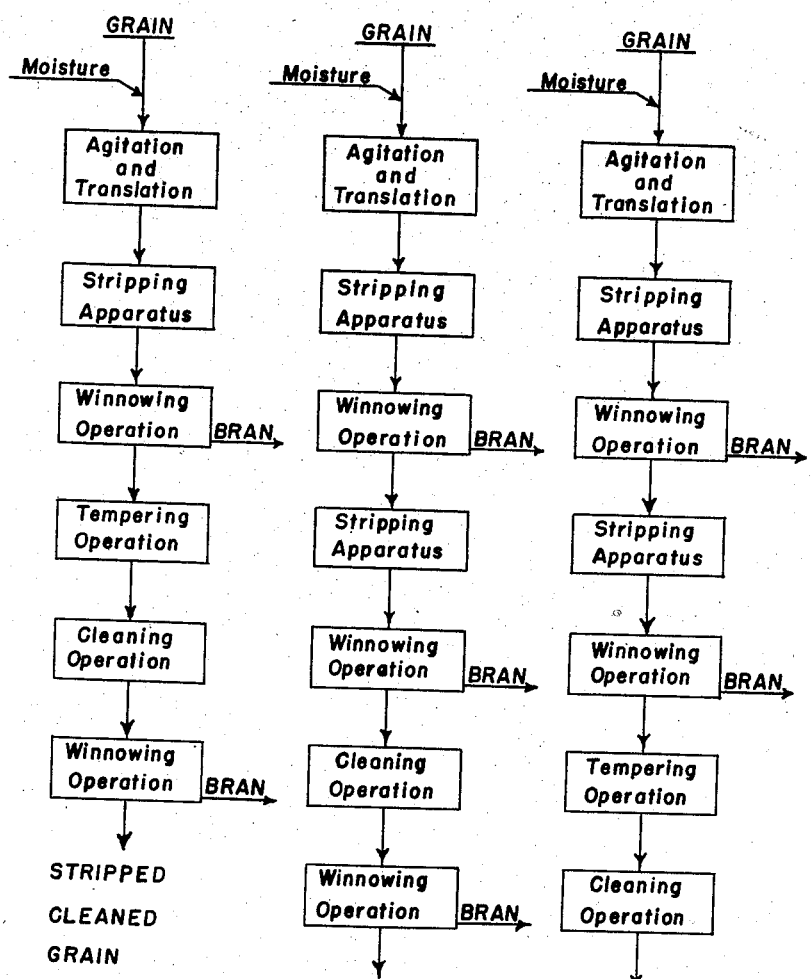
Figure 1 is a flow diagram of successive steps typical of the improved method as correlated to accomplish debranning of certain grains in accordance with the principles of the invention.
Figure 2 is a flow diagram similar to Figure 1 typifying an alternative correlation of steps within the contemplation and effective to accomplish the purposes of the invention.
Figure 3 is a flow diagram of steps typifying the improved method as a combination of the features distinguishing the correlations according to Figures 1 and 2 in a manner effective for the debranning of certain grains, such as hard wheat.

The occasions for, and the problems incident to, the removal of some or all of the integumental material from seeds and cereal grains are so well known, and so universally manifest, as to acquire no elaboration herein. Conventional techniques hitherto applied to the removal of bran coat material, particularly from cereal grains designed for consumption or further processing as human foods, have been less than satisfactory in respect to cost, grain breakage, loss of vitamin and food values, excess berry heating, and the like, hence the instant invention is directed to the provision of a novel method effective to remove the undesired bran coat constituents from cereal grains with full, or nearly full, retention of desired grain food values with facility, low cost, and to attainment of an end product conditioned for conventional use, further processing, or storage.

The principal cereal grains utilized for human food, such as wheat, rye, brown rice, and oats are alike characterized by laminate bran coats in close enveloping relation with the kernel or starchy endosperm of each individual grain.

The bran coats of the various grain varieties will differ as to the number, individual character, and particular interrelation of their constituent laminations, the bran coat of wheat, for example, characteristically consisting of six separate, recognizable laminations whereof the outermost is devoid of food value and expediently separable from the underlying laminations, while the said inner bran coat layers carry nutritional properties and are not adapted to be readily parted, one from another. In the case of brown rice, the multi-layer bran coat reacts progressively and rather uniformly to appropriate techniques for complete detachment from the associated endosperm to condition the latter for use in conventional form and manner. For the purposes of this exposition, the six laminations of the bran coat investment characteristic of wheat are respectively identified, in their succession from the outer side of the kernel and to the endosperm thereof, as the epidermis, or outer layer, the epicarp, or layer directly underlying the epidermis, and thereafter the endocarp, testa, episperm, and aleurone cell layers.

Susceptible of verification by inspection and simple demonstration is the way that the epidermis, or outer layer, of the wheat bran coat is held and bonded to the epicarp layer immediately thereunder by a very thin film of a strong binding material that is normally hard and dry, practically insoluble in water at ordinary temperatures, and reactive to proper moisture-conditioning techniques with such moderation of its adhesive properties as permits ready detachment of the epidermis from the epicarp to which it is normally bonded. A closely analogous bran coat arrangement is characteristic of rye, oats, and certain other grains, hence a discussion of the improved method as applicable to the stripping of bran coat layers from wheat berries is clearly adequate for, and is intended to serve as, a disclosure of the invention as applicable to the treatment of such other grains.

That the binding material as above characterized is present in bonding relation between the epidermis and epicarp layers of wheat berries becomes apparent when the berries are appropriately moistened and then tempered to penetration of the moisture within and through the epidermal layer of the bran coat. As the moisture penetrates the epidermis, the film of binding material thereunder becomes soft and loses its adhesive qualities to an extent that permits a separation of the epidermis from the epicarp through moderate friction of the grain berries one against the other, or between surfaces moving at varying speeds and controlled pressures, such as in the conventional rice cones, under pressures much less than will fracture the berries. Furthermore, the presence of the binding material film may be readily verified by inspection of berries from which the epidermis has been stripped as a consequence of moisture-conditioning and friction as above set forth, such inspection at suitable magnification disclosing a translucent, slightly gray coat retained on the epicarp layer which, when dry, hardens and adheres tightly to the surface of the epicarp. Also, when after moisture-conditioning the treated grain berries are allowed to stand for a short time before they are subjected to friction, the binding material film will reset and harden to a degree inhibiting stripping away of the epidermis from the epicarp.

As applied to the stripping of the epidermal layer material from wheat berries with retention of the germ and underlying bran coat layers on the treated grain, the method of the present invention involves as a first step the moisture-conditioning and time-tempering of the grain berries in a manner to release the bond normally holding said layers together. As a first step of the improved method water is added to the grain to be treated in appropriate amount and in any convenient condition, either hot, cold, or as steam. The amount of water effective to accomplish the purposes of the invention when added to the grain is rather critical and will range between three and one-half and seven percent of the grain weight. Several factors operate to determine the precise amount or proportion of moisture to be added to a given grain for optimum results within the contemplation of the invention. Obviously, the amount of moisture added to the grain must be adequate to permit full penetration of the epidermal layers of all the grain berries and to soften the film of binding material thereof. The maximum amount of moisture adequate to penetrate the epidermal layers of berries and to soften the binding film as a consequence of such penetration is hardly adequate to maintain the binding film in an appropriately softened condition during the subsequent operation of the grain treatment, while some excess moisture should be applied to the grain to obviate the possibility that the softened binding film may reset because of inadequate moisture before the grain treatment has been completed. The maximum amount of moisture to be added to the grain is determined by facts pertinent to subsequent treatment of the moisture-conditioned material. Excess moisture in the grain is productive of a soggy, sticky grain condition such as hampers grain migration in the agitated grain mass and acts to nullify frictions of grain against grain consequent upon mass translation and agitation, and in addition the presence of excess moisture precludes the effective winnowing of detached material from the grain under treatment, clogs and obstructs the apparatus utilized to agitate the treated grain mass, and penetrates the ultimate grain products to a degree requiring its removal, through the application of heat, or otherwise, to condition the treated grain for use, storage or milling. When the amount of added moisture is correct, the binding film will be softened and maintained in such nonbonding condition for a period adequate to the subsequent steps of treatment, the surfaces of the berries will be slightly adherescent to a degree productive of frictions between engaged and relatively moving such surfaces which tend to strip the so-engaged outer coats away from the berries, and the grain berries will yet be free from tendency to cohere and will individually roll and migrate in the grain mass as the latter is agitated and translated. Through reference to foregoing criteria it is feasible to determine the proper amount of moisture to be added to a given grain for effective treatment thereof by the method of the present invention, approximately five percent of moisture by weight of the grain having been demonstrated to be satisfactory for practice of the method on many small grains, while some additional moisture is usually required for grains characterized by berries of small size.

A second and significant phase of the improved method is the tempering of moisture-conditioned grain for a period of time adequate to accomplish penetration of the moisture through the epidermal layer of the bran coat to, through, and with softening effect upon the film of binding material between the epidermal layer and the epicarp of the grain berries. During, or immediately subsequent to, the addition of moisture to the grain material, the material is agitated to a moderate degree and through any appropriate means to uniformly and thoroughly mix grain and moisture and to assure complete and uniform coating of the grain surfaces with the wetting agent. The initial mixing of the grain material with the added moisture is effective to accomplish some penetration of the moisture within the epidermal layers of the bran coats, but the time involved in such mixing is ordinarily insufficient to accomplish the moisture penetration necessary for loosening and ultimate detachment of the penetrated bran coat layer, hence a second positive phase of the method involves continued moderate agitation of the wetted grain material, preferably with translation of the grain mass from the initial mixing operation and to a subsequent processing phase, through a time period adequate for completion of the moisture penetration of the epidermal layer to the extent requisite for the practice of the method and of such limited duration as to obviate such drying of the wetted grain as might re-establish the binding effect of the softened film between the epidermal and epicarp layers. The actual time period optimum for tempering of the moistened grain within the contemplation of the invention will naturally vary somewhat with different grain materials, with the temperature obtaining during the tempering operation, and perhaps with other factors, but is generally on the order of some six to twelve minutes. The operation of mixing the grain material with the added moisture can well be completed in some two minutes, whereafter the moistened grain should remain subject to penetration by its moisture coating with such agitation of the mass as will permit migration of the berries therein for a period of perhaps four to ten minutes, the tempering operation being continued in any event until such absorption by the epidermal layers as will free the berries from any tendency to stick together and will condition the berries to roll and move freely relative to one another. Such tempering of the moistened grain results in full absorption of moisture by the epidermal layers of the bran coats with possibly some expansion of the outer layer material tending to pull the same away from the underlying epicarp; the tempering also results in penetration of moisture to, through, and with softening effect upon the film of binding material between the epidermal and epicarp layers of the bran coats, thus moderating the binding effect of the film to a degree facilitating detachment of the possibly expanded epidermal layer; and such tempering will occasion a slight penetration of the moisture within the epicarp. The wetted grain mass may be permitted to remain in place subject to agitating influences after initial mixing with the added moisture has been completed, thus to accomplish the requisite tempering. More practically, since the grain mass is moved to a stripping operation after it has been appropriately moistened and tempered, the tempering operation may expediently be accomplished as the grain mass is translated by any appropriate means from the mixing operation and through the stripping equipment; screw conveyors and analogous apparatus being available and being effective for translation of the wetted material with that degree of consequent agitation that is particularly effective to accomplish the tempering of the moistened grain in accordance with the principles of the invention.

Actual detachment of epidermal material from the moistened and tempered grain is accomplished with a stripping action resulting from frictions and pressures applied to the conditioned grain mass through any appropriate type and construction of apparatus effective to roll, tumble, agitate and translate the grain in frictional surface engagement of the berries with elements of the apparatus and with one another under pressures less than will fracture the berries. The action of the stripping apparatus is essentially a combination of pressures and frictions incident to rotation and may be developed through a variety of particular machines. Types of apparatus suitable to accomplish the stripping action peculiar to the improved method are well known and available; a representative form of such apparatus including a tubular casing, either stationary or rotatable about its axis, shafts associated with and through said casing in either fixed or independently-rotatable association therewith, and paddles, screws, flanges, or baffles associated with said casing and shafts, either or both, in an arrangement effective to stir, agitate, and translate a grain mass charged within the casing as an incident of casing or shaft rotation. The elements of the stripping apparatus in actual contact with the grain charge may be covered with material having a high coefficient of friction, such as rubber, whereby to enhance the stripping effect of such elements on the grains in contact therewith and to minimize breakage of berries rubbed therealong, and an area of the casing traversed by the grain charge may be reticulate or foraminous to function as a screen through which detached epidermal material may be diverted from the apparatus during the stripping action thereof. Manifestly, the time during which the conditioned grain is held within and subjected to the action of the stripping apparatus is material to the extent and effectiveness of epidermal material detachment and the apparatus is consequently organized for regulation, as by means of an adjustable grain discharge, of the time period during which the grain is acted upon by the apparatus. The pressures acting upon the migrating grains during the treatment and agitation within the stripping apparatus largely determine the degree of friction to which the grain surfaces are subjected, and such pressures vary with speed of casing or shaft rotation applied to translation of the grain through the casing and with the resistance to grain discharge from the casing in a manner which permits a regulation and a control of the pressures and consequent frictions through appropriate adjustment of the factors controlling grain translation within and grain discharge from the stripping apparatus. The actual time during which a given grain should be subjected to stripping action will necessarily vary with the nature and variety of the grain, the amount of epidermal material desired to be removed from the grain, and the completeness of such removal desired to be obtained, but, in any event, the stripping should be accomplished while the film of binding material between the epidermal and epicarp layers is moisture-softened and before such loss of moisture from the grain surfaces as will permit the film to reset. Agitation of the grain material within the stripping apparatus subject to the pressures and frictions above described acts to elevate the temperature of the grain mass well above that obtaining in the grain when charged into the apparatus; grain temperatures as high as 100° F. having been noted on occasion in the grain discharge from the stripping apparatus. This elevation of temperature contributes beneficially to the stripping operation by facilitating penetration of moisture to and through the film of binding material underlying the epidermal layer and by enhancing and prolonging the softening effect of the moisture on said film. The temperature of grain discharge from the stripping apparatus is indicative of the frictions and pressures obtaining within the apparatus and may be utilized as a criterion for regulation thereof. An excessively high temperature indicates that moderation of pressures and frictions should be had, since such high temperatures and the corresponding high frictions and pressures are productive of grain breakage and act to unduly evaporate the moisture carried by the inner bran coat layers and the endosperm of the grain. The discharge temperatures for best results will vary with different grains but are susceptible of regulation and control to retain a small excess of moisture in and on the stripped grain as it leaves the apparatus.

Grain that has been properly moistened and tempered leaves the stripping apparatus as a loose, non-sticky mixture of stripped berries, partially stripped berries and detached epidermal material wherein the slight excess of moisture remaining from that initially applied to the grain is largely, if not entirely, absorbed in the grain berry surfaces and the detached epidermal material. From the stripping apparatus, the treated material is passed through a winnowing operation where the agitated material is subjected to currents of air from a fan, or equivalent instrumentality, in a manner to separate light, flaky, detached epidermal material from the grain berries. Applied to grain that has been suitably conditioned, the first stripping and winnowing operations are effective to remove approximately twenty-five percent, or more, of the epidermal material from the berries and to detach and loosen the remaining epidermal material so that it is but loosely held on the berries in condition for ready removal through subsequent processing.

As represented in the diagram of Figure 2, the grain berries from the initial stripping and winnowing operation may go directly to a second stripping apparatus where they are again rolled and agitated under appropriate pressures for the development of frictions between the grains and between the grains and elements of the apparatus in substantially the same manner as hereinabove discussed. The second stripping operation is effective to very largely clean the berries free from any adhering epidermal coat material so that the grain and bran delivered from the second stripping operation is conditioned for a second winnowing operation effective to separate the stripped grain from the associated bran to leave the grain berries substantially free from any adherent or commingled epidermal coat material. When the grain goes directly from the first stripping and winnowing operation to the second stripping apparatus there is the advantage of a retained grain temperature elevation deriving from the first stripping operation which is supplemented by the heat generated by the second stripping operation and assists in the desired removal of epidermal coat material from the berries, the temperature of the grain delivered from the second stripping operation customarily ranging from 80° F. to 90° F. As a final stage of the improved method the treated grain is subjected to a cleaning operation accomplished by agitation and migration of the berries within and through a stripping apparatus where loosened epidermal coat material still adhering to the berries is rubbed off to complete detachment of seventy-five percent to eighty percent, by weight, of the total amount of such outer coat material originally present on the grain; only that epidermal coat material present in the infolding of the grain crease being retained on the treated berries. From the cleaning operation the treated berries pass to a final winnowing operation where the detached outer coat material is blown away from the stripped berries to condition the latter for milling, storage, and other processing. Natural grain available for milling will normally carry an average of about twelve percent of total moisture, but a moisture content of about fifteen percent is desirable for milling purposes, and the grain treated and stripped as hereinabove will retain a small amount of the moisture added thereto and absorbed in the endosperm and retained bran coats to provide a total moisture content in the treated grain approximating that optimum for milling. When the treated grain is to be stored, any surplus of retained moisture may be eliminated through evaporation under controlled conditions or through exposure of the treated grain to drying techniques, and the like.

Alternative to the foregoing and as represented by the diagram of Figure 1, the second stripping and winnowing phase of the method may be eliminated in favor of a further time-tempering of the grain from the first stripping and winnowing operation. The second time-tempering phase is effective to facilitate penetration of surface moisture through epidermal coat material retained on the berries after the first stripping operation for such softening of the binding film and loosening of the retained coat material as will permit removal of the latter in the final cleaning and winnowing of the grain, thereby shortening somewhat the practice of the method in a manner particularly applicable to the effective treatment of grains such as rice and soft wheat.

Where, as in the case of certain hard wheats, satisfactory stripping of the grain is relatively more difficult, the techniques represented by the diagrams of Figures 1 and 2 may be combined in the manner represented by the diagram of Figure 3. As represented in the latter diagram, the moisture-conditioned and time-tempered grain subjected to first and second stripping and winnowing operations is further tempered as just above explained before passing to the final cleaning phase, the time-tempering step distinguishing the diagrams of Figures 1 and 3 conveniently being accomplished by permitting the partially-stripped grain to stand for absorption of moisture during a period on the order of two hours, or more.

The improved method, substantially as above described, is applicable to the stripping of bran coat material from rice through certain minor modifications of technique. The rice berry differs from that of wheat in that it carries but five bran coat laminations and has no crease. The rice bran coats easily absorb small amounts of moisture to then become relatively soft and readily separable in whole or in part from the berry. Much of the vitamin content of rice is contained in the germ and in the aleurone layer of the bran, hence retention of these berry elements such improves the food value of the grain. After appropriate moisture-conditioning and time-tempering of the grain, the bran coat of rice may be readily removed from the berries in two distinct parts whereof the first is a dark tan in color and is characterized by bitter and unpleasant taste while the second is a light tan in color, has a sweet taste and carries some vitamin. Through control of the amount of moisture added to the grain, the duration of the tempering step, and the pressures utilized in the stripping operations, varying amounts of the first and second bran coat constituents may be removed for the production of a desired ultimate grain product. Further, it is apparent that the germ of the moistened and tempered rice berry adheres more tenaciously and is less brittle than is normal with the dry grain, thus facilitating retention of the germ with its food values during the stripping of the bran coat material from the grain.

Because of the distinctive physical structure of rice, the grain may be conditioned for stripping in accordance with the principles of the improved method, particularly typified by the diagram of Figure 1, with a considerably less proportion of water than is appropriate for the treatment of wheat, rye, and the like. It has been determined that as little as one-half of one percent of added water, by weight, may be effective to soften and loosen the rice bran coats for effective removal from the berries, while certain types and varieties of the grain may require up to four percent of added moisture for effective processing. The moistened rice may be tempered for extended periods of time, up to twenty minutes or more, without adverse effect upon the stripping qualities developed by the moisture added thereto, there being no binding film between the bran coat layers of rice analogous to that found in wheat. With some variation deriving from the variety and type of the grain, the grain size, and the amount of bran coat material desired to be removed, an addition of some two percent, by weight, of moisture and a tempering period of from five to twenty minutes is customarily effective to condition rice for the stripping, winnowing, further tempering, and cleaning phases of the method as hereinabove set forth. As should be manifest, the character of the rice berries and their bran coats and the ease with which the bran coat material may be detached from the berries all contribute to the use of moderate pressures and frictions imposed by the stripping apparatus, thus to minimize grain breakage and germ detachment while maintaining an efficient stripping effect.

Illustrative of the practical application of the improved method to distinctive grains, the following examples are typical.

Utilizing the technique represented by the diagram of Figure 1, two percent of water, by weight, was added to a Patna, long grain brown rice and was mixed therewith for eight minutes before being subjected to a first stripping action; the temperature of the grain charged into the stripping apparatus being 65° F. In the first stripping operation 3.6% of the grain weight was removed as bran, 4.3 pounds were stripped per minute, and the temperature of the grain discharged from the first stripping operation was 86° F. The discharge from the first stripping operation was tempered by standing for a period of two hours and then subjected to the cleaning operation wherein 8.5 pounds were stripped per minute, 2.1% of the grain weight removed as bran; the temperature of the grain introduced to the cleaning operation being checked at 74° F. while the temperature of the grain discharged from said operation was 84° F. In this example a total grain breakage of 13.1% was noted and the total bran removed from the berries was 5.7% of the original grain weight.

The technique represented by the diagram of Figure 1 was applied to the removal of epidermal coat material from a soft, white, Baart wheat through addition to the grain of five percent, by weight, of water, and a tempering of the moistened grain for six minutes prior to its introduction to the stripping operation. Introduced to the stripping apparatus at 65° F. and emerging therefrom at a temperature of 88° F. the conditioned grain was stripped at the rate of 4.2 pounds per minute with the removal of 2.8% of the grain matter as bran. The partially stripped grain from the first stripping operation was tempered by standing for a period of two hours and then introduced at a temperature of 62° F. to the cleaning operation, wherein stripping was accomplished at the rate of 9.5 pounds per minute with an additional removal of 0.4% of the grain weight as bran; the grain discharge from the cleaning operation having a temperature of 66° F. Thus the method was applied to a removal of epidermal bran coat material from the grain in a total amount of 3.2% of the grain weight.

A hard, red, Montana Marquis wheat was treated by the technique typified by the diagram of Figure 3 through admixture with the grain of five percent, by weight, of water and a tempering of the moistened grain for six minutes. Introduced to the first stripping operation at a temperature of 45° F. and subjected to stripping action at the rate of six pounds per minute, the grain was discharged from the first stripping operation at a temperature of 84° F. with no appreciable removal of epidermal coat material. The discharge from the first stripping operation was tempered by standing for a period of three minutes and then introduced to the second stripping operation at a temperature of 70° F. and treated at the rate of 9 pounds per minute with a removal of epidermal coat material amounting to 3.25% of the grain weight and to the development of a grain discharge temperature of 84° F. After the second stripping operation the grain was tempered by standing for a period of two hours and then introduced to the cleaning operation at a temperature of 70° F. In the cleaning operation the grain was treated at the rate of ten pounds per minute with an additional removal of epidermal coat material in the amount of 0.45% of the grain weight and the development of a temperature of 74° F. in the grain discharge. This application of the improved method resulted in a total removal of epidermal coat material amounting to 3.7% of the original grain weight and no breakage of grain, or loss of germ material.

I claim as my invention:

1. The method of stripping exposed laminations of epidermal material from cereal grains having laminate bran coats characterized by interbonding films disruptively reactive to moisture which consists of the sequentially-correlated steps of admixing with the normally dry grain a proportioned amount of added moisture wholly absorbable by the epidermal material laminations to be removed in penetration therethrough to softening and relaxing effect upon the bonding films thereunder, moderately agitating the moistened grain for a time period adequate to uniformly distribute the added moisture over and to absorb the same within the epidermal material of the grain to substantial elimination of free moisture from the surfaces of the grain berries and consequent initial loosening of the penetrated epidermal material, promptly agitating the moisture-conditioned, substantially surface-dry grain mass to generation of pervading indiscriminate grain berry migrations under gentle controlled pressures less than will fracture the berries promotive of frictions diversely and intermittently acting on the contacting berry surfaces to slough therefrom the loosened epidermal material, winnowing the so-treated grain for separation of detached epidermal material from the stripped berries, conditioning the winnowed berries through standing as a mass for a time period effective to establish penetration of retained moisture through the freshly-exposed laminations of the epidermal material of the berries to softening and relaxing effect upon the bonding films thereunder, again agitating the so-conditioned, substantially surface-dry grain mass to generation of pervading indiscriminate grain berry migrations under gentle controlled pressures less than will fracture the berries promotive of frictions diversely and intermittently acting on the contacting berry surfaces to slough therefrom the loosened epidermal material, and subsequently again winnowing the grain for segregation of a stripped, cleaned grain berry product substantially free of epidermal material detached therefrom.

2. The method of stripping exposed laminations of epidermal material from cereal grains having laminate bran coats characterized by interbonding films disruptively reactive to moisture which consists of the sequentially-correlated steps of admixing with the normally dry grain added moisture in an amount approximating five percent of the grain weight wholly absorbable by the epidermal material laminations to be removed in penetration therethrough to softening and relaxing effect upon the bonding films thereunder, moderately agitating the moistened grain for a time period on the order of four to ten minutes adequate to uniformly distribute the added moisture over and to absorb the same within the epidermal material of the grain to substantial elimination of free moisture from the surfaces of the grain berries and consequent initial loosening of the penetrated epidermal material, promptly agitating the moisture-conditioned, substantially surface-dry grain mass to generation of pervading indiscriminate grain berry migrations under gentle controlled pressures less than will fracture the berries promotive of frictions diversely and intermittently acting on the contacting berry surfaces to slough therefrom the loosened epidermal material, winnowing the so-treated grain for separation of detached epidermal material from the stripped berries, conditioning the winnowed berries through standing as a mass for a time period on the order of two hours effective to establish penetration of retained moisture through the freshly-exposed laminations of the epidermal material of the berries to softening and relaxing effect upon the bonding films thereunder, again agitating the so-conditioned, substantially surface-dry grain mass to generation of pervading indiscriminate grain berry migrations under gentle controlled pressures less than will fracture the berries promotive of frictions diversely and intermittently acting on the contacting berry surfaces to slough therefrom the loosened epidermal material, and subsequently again winnowing the grain for segregation of a stripped, cleaned grain berry product substantially free of epidermal material detached therefrom.

3. The method of stripping exposed laminations of epidermal material from brown rice whereof the bran coat laminations successively soften and loosen in reaction to absorbed moisture, which consists of the sequentially-correlated steps of admixing with the normally dry rice moisture in an amount up to four percent of the grain weight wholly absorbable by the epidermal material laminations to be removed in penetration therethrough to softening and loosening effect thereon, moderately agitating the moistened grain for a time period adequate to uniformly distribute the added moisture over and to absorb the same within the epidermal material of the grain to substantial elimination of free moisture from the surfaces of the grain berries and consequent loosening of the penetrated epidermal material, promptly agitating the moisture-conditioned, substantially surface-dry grain mass to generation of pervading indiscriminate grain berry migrations under gentle controlled pressures promotive of frictions diversely and intermittently acting on the contacting berry surfaces to slough therefrom the loosened epidermal material, winnowing the so-treated grain for separation of detached epidermal material from the stripped berries, conditioning the winnowed berries through standing as a mass for a time period on the order of two hours effective to establish penetration of retained moisture through the freshly-exposed laminations of the epidermal material of the berries to consequent loosening thereof, again agitating the so-conditioned, substantially surface-dry grain mass to generation of pervading indiscriminate grain berry migrations under gentle controlled pressures promotive of frictions diversely and intermittently acting on the contacting berry surfaces to slough therefrom the loosened epidermal material, and subsequently again winnowing the grain for segregation of a stripped, cleaned rice berry product substantially free of epidermal material detached therefrom.

References Cited in the file of this patent

UNITED STATES PATENTS

| | | |
|---|---|---|
| 145,846 | Cook | Dec. 23, 1873 |
| 671,670 | Hoole | Apr. 9, 1901 |
| 2,232,697 | Earle | Feb. 25, 1941 |

OTHER REFERENCES

"Consolidated Catalogs," edition No. 7, 1949–50–51, by National Miller Publication, Inc., page 506.